US010970732B2

(12) United States Patent
Simon

(10) Patent No.: US 10,970,732 B2
(45) Date of Patent: Apr. 6, 2021

(54) SYSTEM AND METHOD FOR RECEIVING REAL-TIME CONSUMER TRANSACTIONAL FEEDBACK

(71) Applicant: MBP INSIGHTS, INC., Singapore (SG)

(72) Inventor: James J. Simon, Singapore (SG)

(73) Assignee: MBP Insights, Inc., Singapore (SG)

( * ) Notice: Subject to any disclaimer, the term of this patent is extended or adjusted under 35 U.S.C. 154(b) by 0 days.

(21) Appl. No.: 16/559,291

(22) Filed: Sep. 3, 2019

(65) Prior Publication Data

US 2021/0004855 A1  Jan. 7, 2021

Related U.S. Application Data

(60) Provisional application No. 62/870,558, filed on Jul. 3, 2019, provisional application No. 62/861,921, filed on Jun. 14, 2019.

(51) Int. Cl.
*G06Q 30/00* (2012.01)
*G06Q 30/02* (2012.01)
*G06Q 20/36* (2012.01)

(52) U.S. Cl.
CPC ....... *G06Q 30/0217* (2013.01); *G06Q 20/363* (2013.01); *G06Q 30/0215* (2013.01); *G06Q 30/0224* (2013.01); *G06Q 30/0234* (2013.01)

(58) Field of Classification Search
CPC ............. G06Q 30/0217; G06Q 20/363; G06Q 30/0215; G06Q 30/0224; G06Q 30/0234
USPC ........................ 703/14.4, 14.49, 14.73, 14.19
See application file for complete search history.

(56) References Cited

U.S. PATENT DOCUMENTS

| | | |
|---|---|---|
| 2004/0249712 A1 | 12/2004 | Brown et al. |
| 2006/0053058 A1 | 3/2006 | Hotchkiss et al. |
| 2011/0320246 A1 | 12/2011 | Tietzen et al. |
| 2013/0191197 A1 | 7/2013 | Hamrick et al. |
| 2013/0282458 A1* | 10/2013 | Roberts .............. G06Q 30/0217 705/14.19 |
| 2013/0311337 A1 | 11/2013 | Stoll et al. |

(Continued)

FOREIGN PATENT DOCUMENTS

WO  2015187558 A1  12/2015

OTHER PUBLICATIONS

The International Searching Authority, Notification of Transmittal of the International Search Report and the Written Opinion of the International Searching Authority dated Aug. 3, 2020 for International Application No. PCT/US2020/040707, 11 pages.

(Continued)

*Primary Examiner* — Sun M Li
(74) *Attorney, Agent, or Firm* — Dickinson Wright, PLLC; Stephen A. Mason; Jonathan H. Harder

(57) ABSTRACT

Systems, methods, and storage media for operating a wireless device are disclosed. Exemplary implementations may: select a consumer to provide feedback related to one or more transactions associated with the consumer; transmit, for display on a wireless device of the consumer, a survey comprising one or more questions related to the one or more transactions associated with the consumer; select an incentive offer from an incentive offer database; transmit, for display on the wireless device of the consumer, information related to the incentive offer; receive one or more responses to the survey; and fulfil the incentive offer.

18 Claims, 10 Drawing Sheets

(56) References Cited

U.S. PATENT DOCUMENTS

| | | |
|---|---|---|
| 2014/0040161 A1 | 2/2014 | Berlin |
| 2014/0351033 A1 | 11/2014 | Azevedo |
| 2015/0134439 A1 | 5/2015 | Maxwell et al. |
| 2015/0235307 A1 | 8/2015 | Webb et al. |
| 2016/0042342 A1* | 2/2016 | Proctor, Jr. ............. H04W 4/80 705/39 |
| 2016/0180365 A1 | 6/2016 | Shi |
| 2017/0192648 A1 | 7/2017 | Abedin et al. |

OTHER PUBLICATIONS

The International Searching Authority, Notification of Transmittal of the International Search Report and the Written Opinion of the International Searching Authority dated Sep. 25, 2020 for International Application No. PCT/US2020/036678, seven pages.

International Searching Authority, Search Report and Written Opinion for International Application No. PCT/US20/45028, dated Oct. 21, 2020; 6 pages.

International Searching Authority, Search Report and Written Opinion for International Application No. PCT/US20/52534, dated Jan. 7, 2021; 8 pages.

\* cited by examiner

SYSTEM AND METHOD FOR RECEIVING REAL-TIME CONSUMER TRANSACTIONAL FEEDBACK

CROSS-REFERENCE TO RELATED APPLICATIONS

The present application claims priority to both 1) U.S. Provisional Patent Application No. 62/861,921, filed Jun. 14, 2019 and titled "System and Method for Receiving Real-Time Consumer Transactional Feedback", and 2) U.S. Provisional Patent Application No. 62/870,558, filed Jul. 3, 2019 and titled "System and Method for Receiving Real-Time Consumer Transactional Feedback". The contents of these two applications are incorporated by reference herein in their entirety.

TECHNICAL FIELD

This disclosure relates generally to technological improvements in the fields of electronic collection and analytics of customer satisfaction data. More specifically, the disclosure describes systems and methods for improving response rates and quality of responses to consumer surveys, in particular by incentivizing rapid responses via a consumer's mobile device.

BACKGROUND

Many online and brick-and-mortar merchants, retailers, and service providers rely on consumer feedback in order to help them make business decisions. For example, a merchant may seek information about which products are popular with the consumer and which are not, and why. A retailer or service provider may be able to improve customer service perceptions in a dramatic way by spotting recurring problems or complaints in customer surveys. Some retailers may be interested in understanding similarities and differences in expectations and experiences between a consumer's experiences in a physical store versus in an online transaction. Such feedback, when gathered accurately and quickly, can help a business run more efficiently and profitably.

Conventional methods of surveying customers and collecting customer feedback do not provide high-quality information for a variety of reasons. For example, retailers often request customer feedback at the register or via a paper store receipt. In-person requests for feedback tend to discourage criticism and candid suggestions for improvement, while surveys tied to paper store receipts are usually inconvenient to the consumer because they require the consumer to save the receipt and access it later, often to manually log into a web site and/or enter a code number. Many consumers simply do not notice such a request to provide feedback, even when an incentive such as free merchandise or a contest entry is offered.

In many cases, traditional feedback collection methods are overly burdensome to the consumer, resulting in poor, inaccurate or no feedback to the merchant because the process requires several different types of platforms and media—including paper receipts, websites maintained by third-party data aggregators or otherwise separate from the merchant's primary website, unique login or QR codes, etc. Traditional processes typically also require a significant time investment for which the typical consumer is not adequately incentivized to participate. Further, where incentives are offered in traditional processes, there is typically a lack of immediacy in delivery of the reward—a consumer often has to wait for a separate department or entity to contact them by mail, telephone, or email with still further instructions about how to collect a voucher, coupon, or other reward.

Consumers who do find and respond to traditional survey requests are often not representative of the public or the particular business's customer base, often skewing toward disgruntled customers or those who are much more likely, for one reason or another, to read a store receipt. When feedback is given, the business often receives the information long after the purchase, reducing the reliability and insightfulness of the feedback data.

SUMMARY

In general, the present disclosure provides systems and methods for improving response rates and quality of responses to consumer surveys. One aspect of the present disclosure relates to a system configured to select customer feedback questions and associated incentives. The system may include one or more hardware processors configured by machine-readable instructions. The processor(s) may be configured to select a consumer to provide feedback related to one or more transactions associated with the consumer. The processor(s) may be configured to transmit, for display on a wireless device of the consumer, a survey including one or more questions related to the one or more transactions associated with the consumer. The processor(s) may be configured to select an incentive offer from an incentive offer database. The processor(s) may be configured to transmit, for display on the wireless device of the consumer, information related to the incentive offer. The processor(s) may be configured to receive one or more responses to the survey. The processor(s) may be further configured to fulfil the incentive offer.

In some implementations of the system, the selection of the incentive offer may depend at least in part on a geographical location of the mobile device. In some implementations of the system, the selection of the incentive offer may depend at least in part on an identity of a merchant associated with the one or more transactions associated with the consumer. In some implementations of the system, the processor(s) may be configured to transmit, for display on a wireless device of a consumer, a notification that a survey is available to the consumer. Such notification may typically be accomplished by a push notification to an electronic device, by a text message or email, or by another suitable method of electronic notification. In some implementations of the system, the selection of the consumer may depend at least in part on demographic information or psychographic information associated with the consumer, or on information associated with one or more lifestyle classifications or taxonomies.

In some implementations of the system, the selection of the consumer may depend at least in part on a consumer profile. In some implementations of the system, the consumer profile may be associated with survey preferences defined by a merchant. In some implementations of the system, the incentive offer may be associated with the merchant. In various implementations and throughout this disclosure, the terms "merchant," "retailer," or "service provider" are intended to be expansive and may refer to, as only a few non-limiting examples, a single physical or electronic point of sale, a franchise or chain of points of sale, a group of merchants or points of sale that are somehow related to one another by one or more commonalities such as common ownership, geographical proximity, business partnership, etc.

Another aspect of the present disclosure relates to a method for operating a wireless device. The method may include selecting a consumer to provide feedback related to one or more transactions associated with the consumer. The method may include transmitting, for display on a wireless device of the consumer, a survey including one or more questions related to the one or more transactions associated with the consumer. The method may include selecting an incentive offer from an incentive offer database. The method may include transmitting, for display on the wireless device of the consumer, information related to the incentive offer. The method may include receiving one or more responses to the survey. The method may include fulfilling the incentive offer.

Yet another aspect of the present disclosure relates to a non-transient computer-readable storage medium having instructions embodied thereon, the instructions being executable by one or more processors to perform a method for operating a wireless device. The method may include selecting a consumer to provide feedback related to one or more transactions associated with the consumer. The method may include transmitting, for display on a wireless device of the consumer, a survey including one or more questions related to the one or more transactions associated with the consumer. The method may include selecting an incentive offer from an incentive offer database. The method may include transmitting, for display on the wireless device of the consumer, information related to the incentive offer. The method may include receiving one or more responses to the survey. The method may include fulfilling the incentive offer.

Other technical features may be readily apparent to one skilled in the art from the following figures, descriptions, and claims. These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
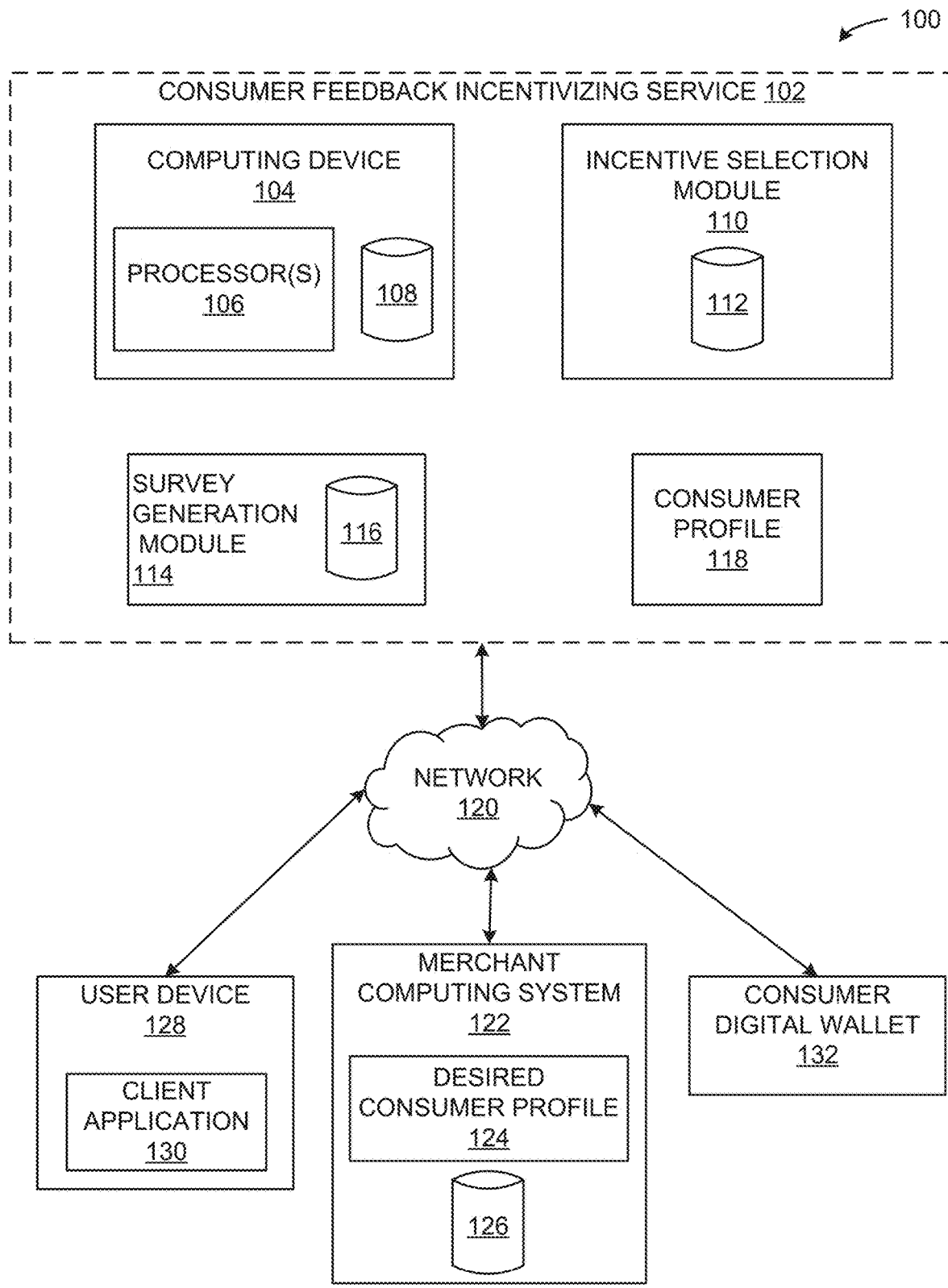
FIG. 1 illustrates a high-level component diagram of an illustrative system architecture, according to some embodiments of this disclosure.

Improvement is desired in the quantity, quality, and timeliness of consumer satisfaction data. By leveraging modern technological hardware to incentivize prompt responses to customer satisfaction surveys, merchants, retailers, and service providers can maximize their efficiency and profits. Conventional methods of surveying customers and collecting customer feedback do not provide high-quality information for a variety of reasons. For example, retailers often request customer feedback at the register or via a paper store receipt. In-person requests for feedback tend to discourage criticism and candid suggestions for improvement, while surveys tied to paper store receipts are usually inconvenient to the consumer because they require the consumer to save the receipt and access it later, often to manually log into a web site and/or enter a code number. Many consumers simply do not notice such a request to provide feedback, even when an incentive such as free merchandise or a contest entry is offered. Consumers who do find and respond to such survey requests are often not representative of the public or the particular business's customer base, often skewing toward disgruntled customers or those who are much more likely, for one reason or another, to read a store receipt. When feedback is given, the business often receives the information long after the purchase, reducing the reliability and insightfulness of the feedback data.

Aspects of the present disclosure relate to embodiments that overcome the shortcomings described above. The present disclosure relates to systems and methods for incentivizing and receiving real-time, near-time, or batch consumer transactional feedback. In addition to providing systems and methods for incentivizing consumer survey participation and collecting more data and more reliable consumer feedback data promptly, the present disclosure describes evaluating the salience of transaction data, consumer data, and feedback and survey data. With respect to evaluating various types of data and profiles as described in further detail herein, the systems and methods may include consideration of weighted averages, nonparametric ranking methods, Bayesian analyses, Markovian processes and analyses, and other types and methods of statistical and data analysis, as appropriate. In general, references to "data" and related concepts in this disclosure should be understood to refer to plain text data, encrypted or hashed data, data stored or transmitted by any other technologically feasible format not specifically named here, or any combination of formats thereof.

Modern artificial intelligence and machine learning bring exciting new technical, operational and heuristic insights and possibilities to the fields of discussion. It should also be understood that, as part of the portions of this disclosure related to data collection and analysis (e.g. collecting consumer feedback, building profiles of actual or desired consumers, identifying purchasing trends, etc.) that various artificial intelligence and/or machine learning principles, as would be apparent to one having ordinary skill in those fields, may be applied to determine the methods of and/or enhance the data analysis and/or uncover additional insights.

As one example, machine learning may be employed to discern the likelihood of a particular incentive offer resulting in a specific consumer or type of consumer participating in giving feedback about a transaction. Such a determination may be made using a variety of input factors, such as the past behavior of a specific consumer and/or consumers sharing particular characteristics, including derived or inferred characteristics. In some embodiments, various parameters may, in general, be ranked according to an expected likelihood of compatibility. For example, all available incentives could be ranked for likelihood of effectiveness at the time of a transaction based on numerous factors including but not limited to demographic and psychographic characteristics of the consumer, geographical location of the point of sale, time of day, type of goods or services involved in the transaction, etc.

FIGS. 1 through 10, discussed below, and the various embodiments used to describe the principles of this disclosure are by way of illustration only and should not be construed in any way to limit the scope of the disclosure.

The example architecture 100 includes a network 120 that communicatively couples various devices, including the consumer feedback incentivizing service 102, user device 128, merchant computing system 122, and consumer digital wallet 132. The network 120 can include local area networks (LANs) and wide area networks (WANs). The network 102 can include wired technologies (e.g., Ethernet®) and wireless technologies (e.g., Wi-Fi®, code division multiple access (CDMA), near-field communication ("NFC"), global system for mobile (GSM), universal mobile telephone service (UMTS), Bluetooth®, and ZigBee®. For example, the user device 104 can use a wired connection or a wireless technology (e.g., Wi-Fi®) to transmit and receive data over the network 120.

In various implementations, all or a portion of the data may be primarily stored or backed up in a distributed ledger system such as, without limitation, blockchain. For example, consumer feedback data may be stored in a distributed ledger system for purposes of maintaining and improving the integrity of the data, which is collected from numerous, disparate devices and sources. Use of a distributed ledger may also enable easier sharing of relevant data across disparate platforms and organizations. A distributed ledger may, in some embodiments, be used to enable and track incentive availability, incentive reward histories, consumer profiles, etc. as further described herein. A distributed ledger may, in some embodiments, be used to enable certain data to be accessed only by authorized parties.

In an exemplary operation, consumer feedback incentivizing service 102 may be configured to select a consumer to provide feedback related to one or more transactions associated with the consumer. Consumer feedback incentivizing service 102 may then select a survey comprising one or more questions related to the one or more transactions associated with the consumer. For example, consumer feedback incentivizing service 102 may communicate information about the selected consumer and/or transaction(s) to survey generation module 114. In some embodiments, the information communicated to survey generation module 114 about the consumer may include all or part of a stored consumer profile 118. According to some embodiments, survey generation module 114 may then match the consumer or characteristics of the consumer with one or more surveys stored in database 116 of survey generation module 114 and transmit the one or more selected surveys back to consumer feedback incentivizing service 102.

According to some embodiments, consumer feedback incentivizing service 102 may transmit, for display on a wireless device of the consumer, the one or more selected surveys related to the one or more transactions associated with the consumer. According to some embodiments, consumer feedback incentivizing service 102 transmits one or more surveys to user device 128 for display, via client application 130 showing on a user interface (e.g., a touch screen or other standard computing interface) of user device 128.

User device 128 may be any suitable computing device, such as a smartphone, tablet, or desktop or laptop computer. User device 128 may be include a user interface configured to execute a client application 130. Client application 130 may be implemented in computer instructions stored on one or more memory devices and executed by one or more processing devices of the user device 128. Client application 130 may be a standalone application installed on user device 128 or may be an application that is executed by another application, such as a website in a web browser.

Consumer feedback incentivizing service 102, according to some embodiments, may include a computing device 104 having one or more processors 106 for executing the tasks of consumer feedback incentivizing service 102 and a computing device database 108. Computing device 104 may be any suitable computing device such as a computer server, laptop, tablet, smartphone, or desktop or laptop computer. The one or more processors 106 may be configured to execute computer instructions stored on computing device 104 or elsewhere in consumer feedback incentivizing service 102. Database 108 of computing device 104 may store any data necessary to enable the operation of consumer feedback incentivizing service 102. For example, database 108 may include consumer profiles including information associated with consumer profile 118, incentive selection module 110, and/or survey generation module 114.

According to some embodiments, consumer feedback incentivizing service 102 may transmit, to incentive selection module 110, information related to the consumer and/or the one or more transactions. According to some embodiments, incentive selection module 110 may then match the consumer or characteristics of the consumer with one or more incentives stored in database 112 of incentive selection module 110 and transmit information about the selected one or more incentives back to consumer feedback incentivizing service 102. Examples of incentives that may be available include the granting of retailer discounts on future purchases, contest entries, free goods or services redeemable at a particular merchant or franchise, reward program points, or any other suitable incentive reward as may be appropriate to the consumers and businesses involved.

Consumer feedback incentivizing service 102 may transmit, for display on a wireless device of the consumer, the one or more incentives selected by incentive selection module 110. According to some embodiments, consumer feedback incentivizing service 102 transmits information related to one or more incentives to user device 128 for display, via a client application 130 showing on a user interface of user device 128.

According to some embodiments, the consumer or other user of user device 128 may input a response to the one or more surveys at the user interface of user device 128. These responses may then be transmitted, via network 120, back to consumer feedback incentivizing service 102.

In response to receiving appropriate survey responses, according to some embodiments, consumer feedback incentivizing service 102 may fulfil the incentive offer. For example, according to some embodiments, consumer feedback incentivizing service may fulfil the incentive offer at least in part by communicating a coupon or voucher to the consumer via user device 128 or other contact information as may be available, for example as part of consumer profile 118. In some embodiments, consumer feedback incentivizing service 102 may fulfil the incentive offer at least in part by adding an incentive benefit to a digital wallet 132 associated with the consumer. For example, consumer feedback incentivizing service may add an incentive reward of a free bagel at a local shop directly into the consumer's digital wallet. Digital wallet 132 according to some embodiments may be Apple Pay™, Google Pay™, Samsung Pay™, or any other suitable digital wallet or digital transaction facilitation application.

According to some embodiments, some or all of consumer feedback incentivizing service 102 may be in communication one or more merchant computing systems 122. For example, a merchant, retailer, or other goods or service provider may establish one or more desired consumer profiles 124 stored in a database 126 of merchant computing system 122. The desired consumer profile(s) may define characteristics of consumers that the merchant would like survey answers from. According to some embodiments, merchant computing system 122 may also provide survey preferences and/or survey questions provided by the merchant to consumer feedback incentivizing service 102 and/or survey generation module 114. According to some embodiments, merchant computing system 122 may also provide incentive preferences and/or information about available incentives to consumer feedback incentivizing service 102 and/or incentive selection module 110.

Merchant computing system 122 according to some embodiments may be any suitable computing devices such as a computer server, laptop, tablet, smartphone, or desktop or laptop computer. Database 126 of merchant computing system 122 may store any data necessary to enable the operation of merchant computing system 122.

Figure 2:
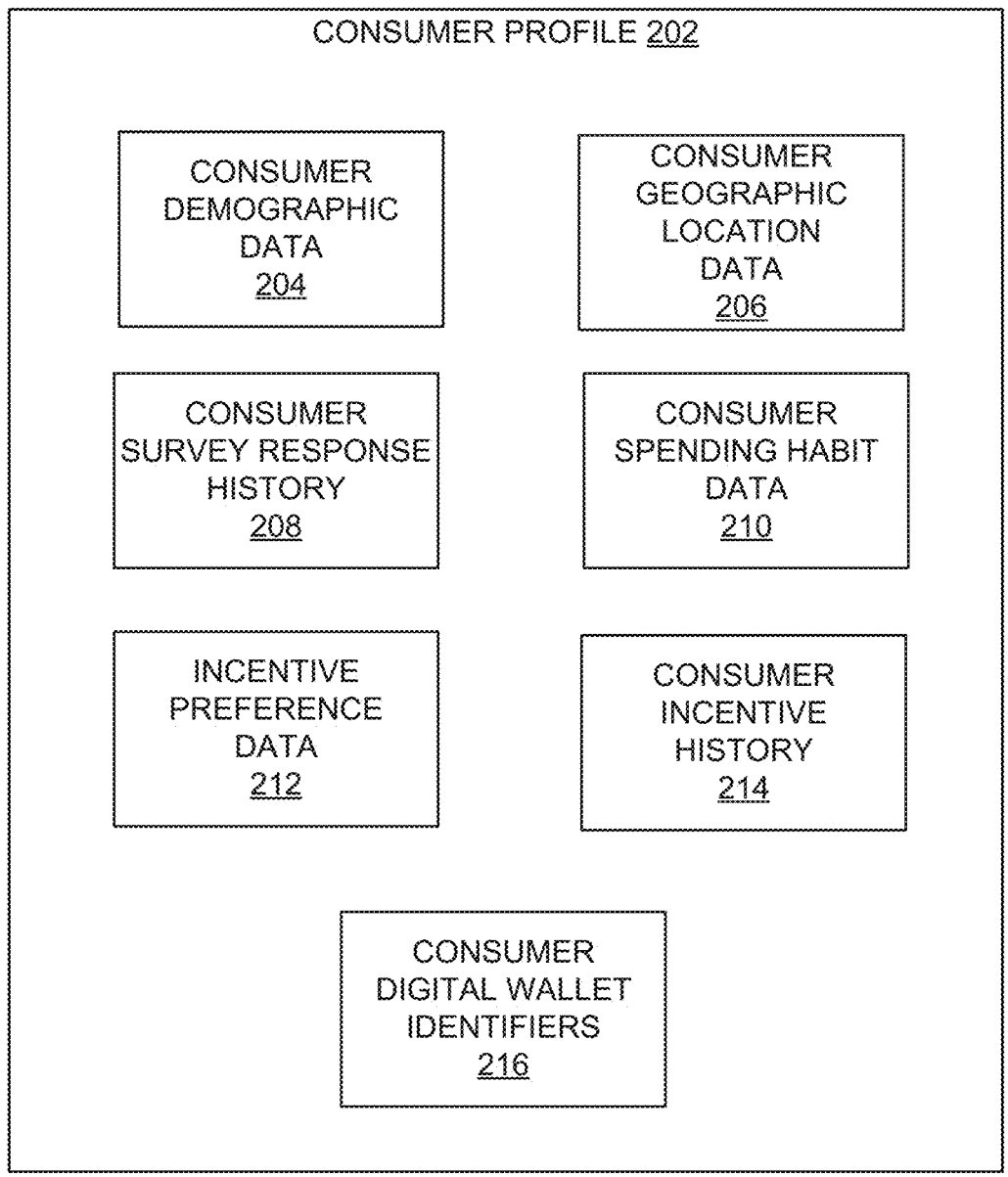
FIG. 2 illustrates details of an example consumer profile according to various embodiments.

FIG. 2 illustrates details of an example consumer profile according to various embodiments. Consumer profile 202 according to some embodiments represents an individual consumer or consumer group. According to some embodiments, a consumer profile 118 of FIG. 1 may be arranged similar to or contain information similar to that described herein with respect to consumer profile 202 of FIG. 2. A desired consumer profile 124, according to some embodiments, may be arranged similar to or contain information similar to that described here with respect to consumer profile 202 of FIG. 2.

Consumer demographic data 204 of consumer profile 202 may include, according to some embodiments, demographic data associated with one or more consumers, such as age, gender, race, occupation, income, hobbies, location of residence, eating habits, and other suitable demographic information. Consumer demographic data 204 and other information of consumer profile 202 may be ultimately intended to provide a high level of granularity to a merchant when considering who is buying or may be likely to buy particular goods or services.

Consumer geographic location data 206 of consumer profile 202 may include, according to some embodiments, geographical location information such as Global Positioning System ("GPS") or other suitable location information location related to a user's residence, workplace, common vacation or work travel locations, favorite restaurants, etc. Consumer geographic location data 206 may also include actual location history of an individual consumer or group of consumers. According to some embodiments, consumer geographic location data 206 may include projections of likely future location information. Any location information of consumer geographic location data 206, according to some embodiments, may be stored with corresponding data and time stamp information.

Consumer survey response history 208 of consumer profile 202 includes, according to some embodiments, information related to whether, when, and how often one or more consumers associated with consumer profile 202—or people sharing certain actual, predictable or derivable characteristics with those one or more consumers—have responded to previous survey questions presented to the one or more consumers associated with consumer profile 202. Such analysis may, in some embodiments, be aided by the use of various artificial intelligence or machine learning techniques, as appropriate. According to some embodiments, consumer survey response history 208 may include information related to the types of survey questions the one or more consumers associated with consumer profile 202 have responded to in the past, and/or projected characteristics of survey questions the one or more consumers associated with consumer profile 202 may be likely to respond to in the future. In some embodiments, a consumer profile 202 may include projected characteristics of consumers who are likely to respond to the survey questions that are available or expected to be available, or for which answers and feedback are desired.

Consumer spending habit data 210 of consumer profile 202 includes, according to some embodiments, information related to past purchases made by the one or more consumers associated with consumer profile 202. According to some embodiments, consumer spending habit data 210 of consumer profile 202 may further include projections related to likely future spending habits of the one or more consumers associated with consumer profile 202. According to some embodiments, information of consumer spending habit data may include purchase amounts and frequency of various types of purchases, and other appropriate consumer spending habit data as one having ordinary skill in the art would recognize.

Incentive preference data 212 and consumer incentive history 214 of consumer profile 202 include, according to some embodiments, information related to whether, when, and how often one or more consumers associated with consumer profile 202 have responded to previous incentives offered (consumer incentive history 214) in exchange for completing surveys. According to some embodiments, incentive preference data 212 may include information related to the types of incentives the one or more consumers associated with consumer profile 202 have responded to in the past and/or projected characteristics of incentives the one or more consumers associated with consumer profile 202 may be likely to respond to in the future.

Consumer digital wallet identifier(s) 216, according to some embodiments, include any suitable digital wallet or digital transaction facilitation platforms associated with one or more consumers associated with consumer profile 202.

Figure 3:
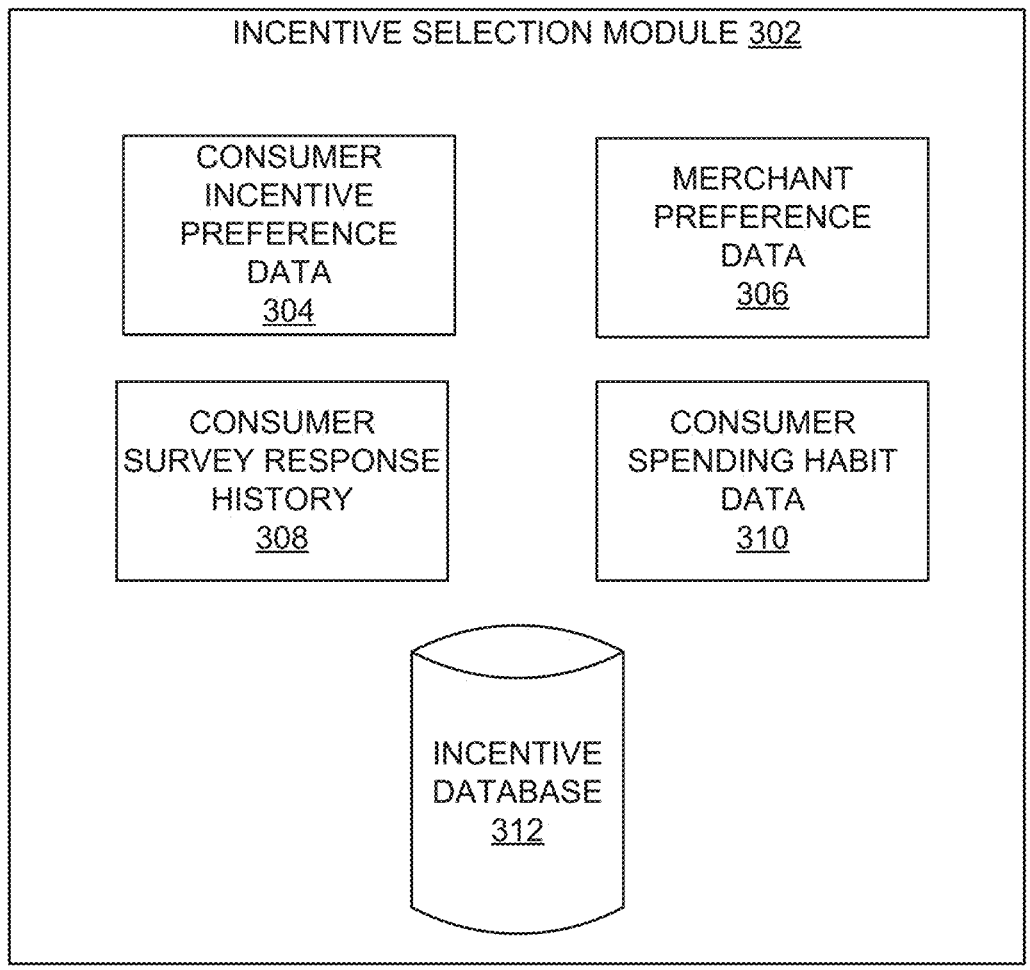
FIG. 3 illustrates details of an example incentive selection module according to various embodiments.

FIG. 3 illustrates details of an example incentive selection module according to various embodiments. Incentive selection module 110 of FIG. 1 may, in some embodiments, be arranged similar to or contain information similar to that described herein with respect to incentive selection module 302. Incentive selection module may be configured, inter alia, to combine known characteristics of a selected consumer or group of consumers with a merchant's preference data and available incentives in order to select the best incentive match when taking into account various factors such as likelihood of response and how closely the targeted or selected consumer (also referred to herein as the "immediate consumer") matches the merchant's preference.

Consumer incentive preference data 304, according to some embodiments, may include information related to the types of incentives the immediate consumer or group of consumers has responded to in the past and/or projected characteristics of incentives the immediate consumer or group of consumers may be likely to respond to in the future.

Merchant preference data 306, according to some embodiments, may include any information provided by a merchant or merchants about a desired consumer that the merchant or merchants would like to have survey feedback data from. Merchant preference data, according to some embodiments, may be input via a merchant interface and survey results may be provided to the merchant through the same interface or another interface. According to some embodiments, merchant preference data may include some or all of the information of a desired consumer profile, which may be similar to a consumer profile 202 as discussed with respect to FIG. 2.

Consumer survey response history 308 includes, according to some embodiments, information related to whether, when, and how often one or more consumers have responded to previous survey questions presented to the immediate consumer or group of consumers. According to some embodiments, consumer survey response history 308 may include information related to the types of survey questions the consumer or group of consumers has responded to in the past, and/or projected characteristics of survey questions the consumer or group of consumers may be likely to respond to in the future.

Consumer spending habit data 310 includes, according to some embodiments, information related to past purchases made by the immediate consumer or group of consumers. According to some embodiments, consumer spending habit data 310 may further include projections related to likely future spending habits of the immediate consumer or group of consumers. According to some embodiments, information of consumer spending habit data may include purchase amounts and frequency of various types of purchases, and other appropriate consumer spending habit data as one having ordinary skill in the art would recognize.

Incentive database 312, according to some embodiments, may be populated with incentives provided by merchants and available immediately, at any time in the future, and/or at other franchise locations or retailers—for example, a free drink or free donut at a local donut shop. According to some embodiments, incentive database 312 may also or alternatively include incentives generated by consumer feedback incentivizing service 102 or other appropriate sources.

Figure 4:
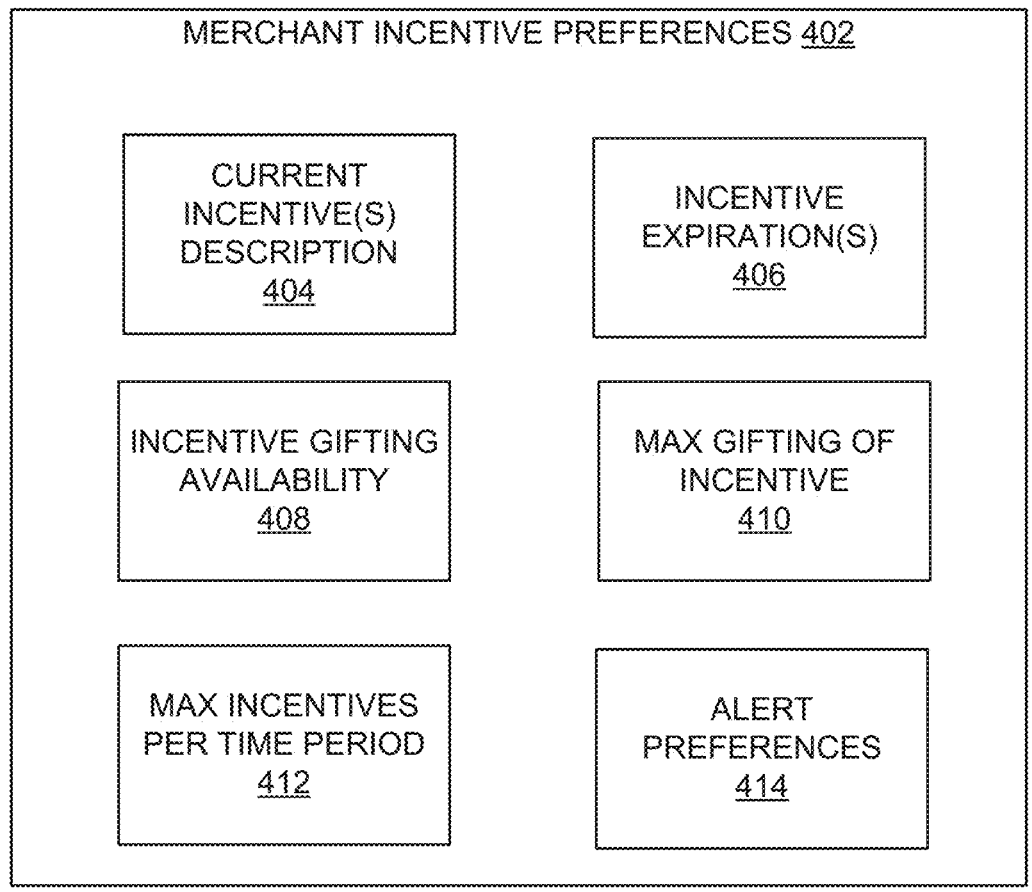
FIG. 4 illustrates a partial list of available merchant incentive preferences according to various embodiments.

FIG. 4 illustrates a partial list of available merchant incentive preferences according to various embodiments. Merchant incentive preferences 402 according to some embodiments represent an individual merchant, retailer, or service provider or a group of merchants, retailers, or service providers. According to some embodiments, merchant incentive preferences may be communicated, for example, from a merchant computing system 122 to an incentive selection module 110 as described with reference to FIG. 1.

According to some embodiments, current incentive(s) description 404 includes details of what incentives are offered by a merchant or group of merchants, how long they are offered, which characteristics of consumers, if any, are required in order to make the offer, and any other appropriate descriptive incentive details as one having ordinary skill in the art would recognize.

Incentive expiration information 406 of merchant incentive preferences 402 may include information including one or more expiration dates associated with available incentives or incentive descriptions 404. "Max incentives per time period" 412 of merchant incentive preferences 402 may define, according to some embodiments, the maximum number of incentives available to an individual consumer or group of consumers within a defined period of time. According to some embodiments, max incentives per time period 412 may define the maximum number of incentives associated with a particular merchant or group of merchants that may be made available to any party during a defined period of time.

Incentive gifting availability 408 of merchant incentive preferences 402 may include, according to some embodiments, information related to whether, how often, and how many times various incentives may be gifted from the original earner to third parties. For example, as described elsewhere herein and according to some embodiments, after the incentive has been fulfilled or delivered to a digital wallet of a consumer, the consumer may be presented with an option to gift the same or similar incentive to a third party, or to split a gift incentive among multiple parties. According to some embodiments, "max gifting of incentive" 410 may define, with regard to one or more incentives, a maximum number of times an incentive may be gifted during a defined period of time, during the life of the incentive, during the life of the consumer or merchant, or any other appropriate restriction as would be apparent to one having ordinary skill in the art.

According to some embodiments, alert preferences 414 may define the type and frequency of notifications provided to consumers and/or merchants regarding incentive status or earning.

Figure 5:
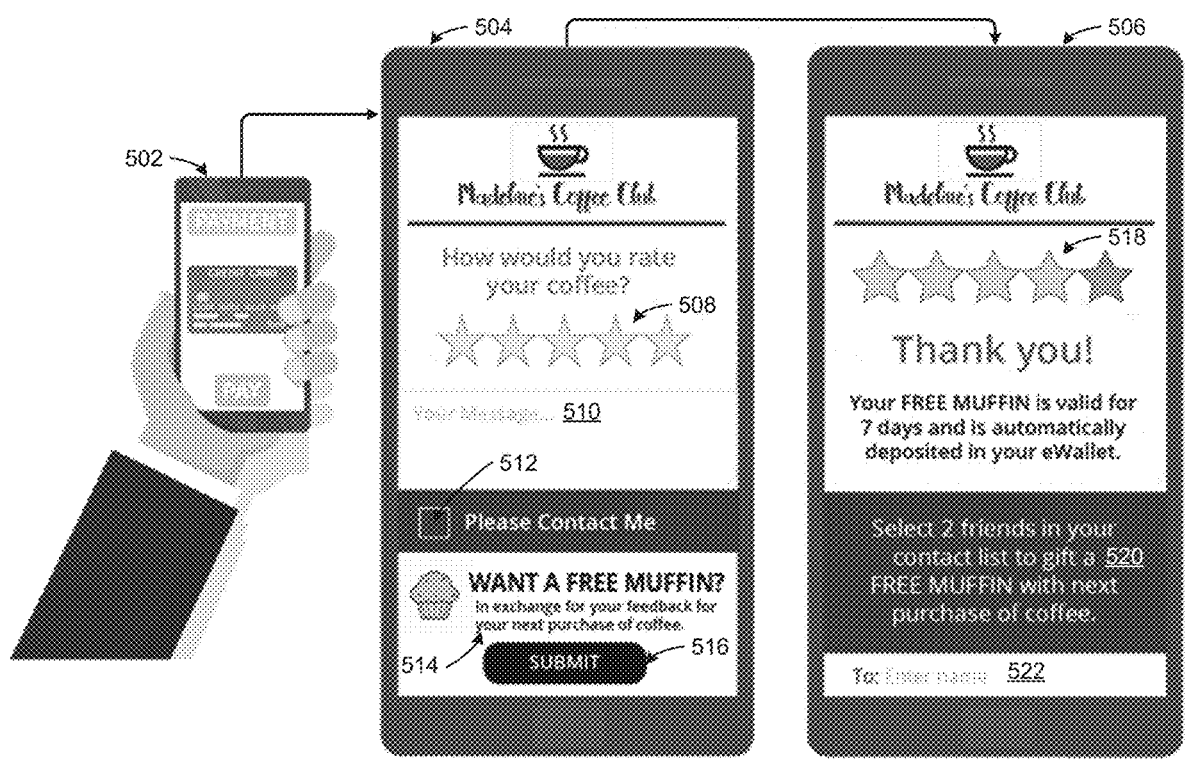
FIG. 5 illustrates example consumer device applications screens according to some embodiments of the present invention.

FIG. 5 illustrates example consumer device application screens according to some embodiments of the present invention. All aspects of the interface and content presented here are merely exemplary and shall not, for example, be understood to limit the disclosure to any particular user interface configuration.

Screen 502 shows an exemplary payment interface on a user device, for example user device 128 as described with reference to FIG. 1. At screen 502, a user is presented with options to complete payment associated with a purchase. According to some embodiments, this payment screen may be a digital wallet application itself or linked to a digital wallet of the user.

After payment is completed, according to some embodiments, the user is presented with screen 504. Interface 508 presents, as an example, a survey question in the simple and familiar "star rating" format. The commonly used "star rating" format is merely exemplary, and numerous other simple rating systems are available, as would be apparent to one having ordinary skill in the art. Field 510 according to some embodiments allows the user to type a message to the retailer if desired.

According to some embodiments, selection 512 of screen 504 allows the user to specify that the user would like to be contacted by the merchant, for example in the event the user has a complaint or praise to share regarding the goods or services of the merchant or service provider.

At location 514 of screen 504, according to some embodiments, an incentive is presented to the user to entice the user to complete the survey question 508. According to some embodiments, submit button 516 allows the user to choose to claim the incentive offered at location 514 of screen 504.

After completion of the survey question 508 of screen 504 and claiming the incentive offered at location 514 of screen 504, the user is presented, according to some embodiments, with screen 506 or similar Interface location 518 displays, according to the exemplary embodiment, the results of the consumer or user's response to survey question 508.

At location 520 of screen 506, the user is presented, according to some embodiments, with an offer to gift an incentive to one or more third parties. According to some embodiments, field 522 of screen 506 allows the user to enter identification information of one or more third parties to receive a gifted incentive. For example, a user may enter into field 522 one or more e-mail addresses, digital wallet IDs, phone numbers, messenger application IDs, biometric information, encryption or other keys, or other appropriate identification information as would be apparent to one having ordinary skill in the art.

Figure 6:
FIG. 6 illustrates an example display of an incentive reward appearing in a digital wallet interface according to some embodiments.

FIG. 6 illustrates an example display of an incentive reward appearing in a digital wallet interface. According to some embodiments, screen 602 may represent a digital wallet application or another client application, for example client application 130 of user device 128 as described with reference to FIG. 1.

Identifier 604 of screen 602, according to some embodiments, identifies the particular digital wallet or other payment platform in present use. At field 606 in the exemplary embodiment, a user is presented with credit card information related to the digital wallet and/or a recent transaction or transactions.

At location 608 of screen 602, an incentive reward is shown as being available in the digital wallet 604. According to some embodiments, and as discussed in further detail herein, an incentive reward may be transmitted to or enabled directly in a consumer's digital wallet in response to the consumer completing one or more prerequisites to earning the incentive—for example by transacting business with and completing a survey question from an incentivizing merchant.

Figure 7:
FIG. 7 illustrates an example display of an electronically generated social media post according to some embodiments.

FIG. 7 illustrates an example display of an electronically generated social media post. According to some embodiments, screen 702 may represent a social media post automatically generated on behalf of a user, for example by a consumer feedback incentivizing service 102 as described with reference to FIG. 1.

Identifier 704 of screen 702, according to some embodiments, identifies the particular social media platform in present use. Example profile information 706 of screen 702 shows an identity of the member of social media platform 704 who will make the social media posting.

According to some embodiments, social media post 708 includes a message automatically generated on behalf of the social media user. Controls 710 of screen 702, according to some embodiments, provide additional controls related to social media posting. According to some embodiments, field 712 of exemplary screen 702 allows the social media user to add additional comments to the social media posting, if desired.

Figure 8:
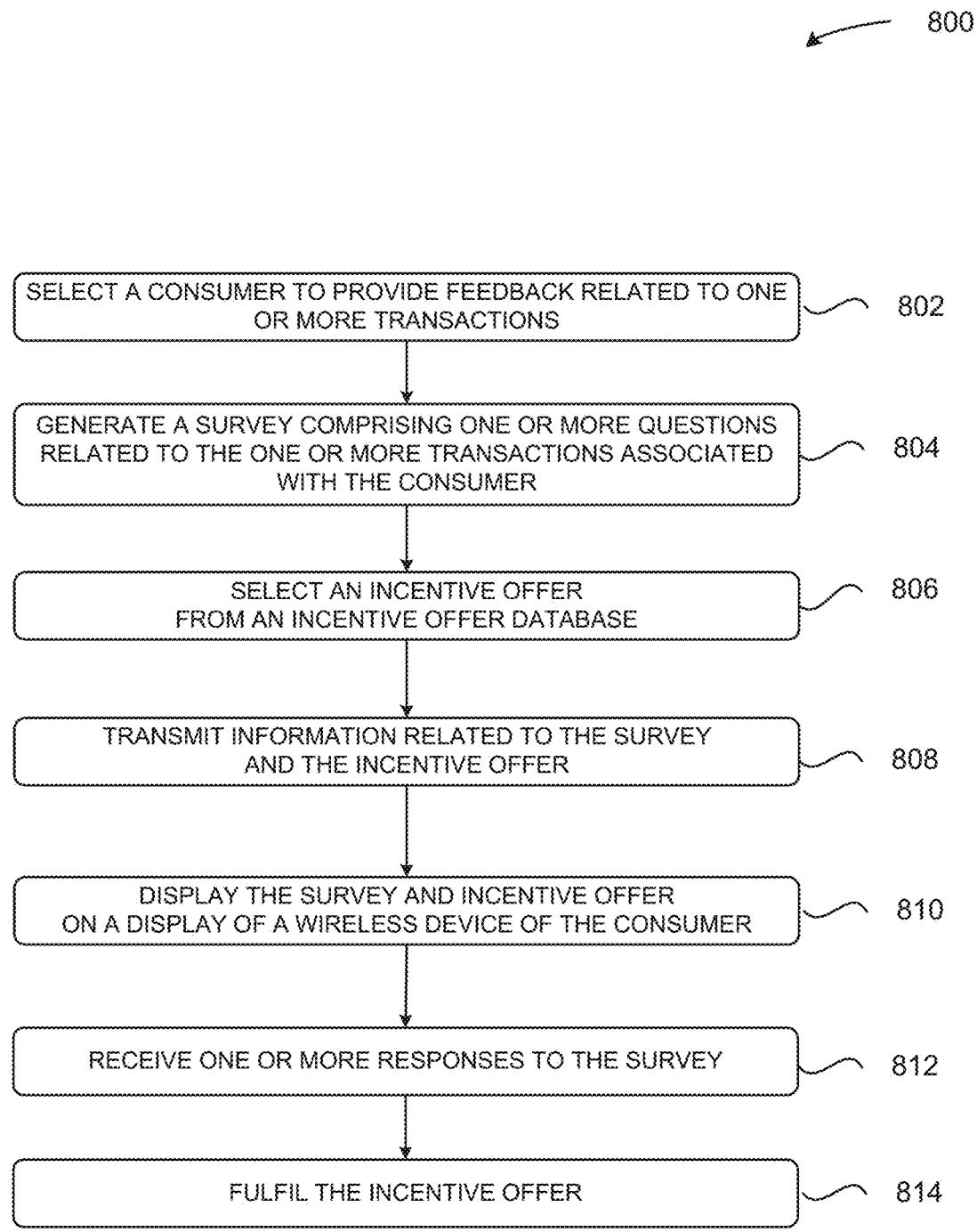
FIG. 8 represents a flowchart for a method of receiving real-time consumer transactional feedback according to some embodiments of this disclosure.

FIG. 8 represents a flowchart 800 for a method of receiving real-time consumer transactional feedback. According to some embodiments, some or all of the steps of flowchart 800 may be carried out by a system like system 100 as described with reference to FIG. 1.

At step 802, a consumer is selected to provide feedback related to one or more transactions conducted by the consumer. According to some embodiments, the consumer may be selected based on matching characteristics of a desired consumer profile provided by a merchant. In some embodiments, a consumer may be selected at least in part on the basis of the consumer having transacted business with a particular merchant's or set of merchants that have requested that all of that merchant or set of merchant's customers be surveyed.

At step 804, a survey is generated for the consumer, the survey comprising one or more questions related to the one or transactions associated with the consumer. As just a few examples, a survey question may simply ask for a general level of satisfaction with the merchant's services, with the merchant's product offering, or with the transaction generally.

At step 806, an incentive offer is selected. According to some embodiments, the incentive offer may be selected from an incentive database, for example because the consumer or transaction matches characteristics of a desired consumer profile provided by a merchant.

At step 808, according to some embodiments, information related to the survey and the incentive offer is transmitted to the user or the user's device. In a typical embodiment, the survey and incentive offer may be presented to the consumer on the consumer's device (e.g., smartphone) via a touch user interface (step 810).

At step 812, a response to the survey is received from the user or consumer. For example, in a typical implementation, a consumer would use a touch screen of the consumer's device to complete the survey.

At step 814, in response to receiving the survey response (according to some embodiments, a prerequisite for obtaining the incentive), the incentive is fulfilled. For example, the incentive information may be transmitted to the consumer's device or directly to the consumer's smart wallet.

Figure 9:
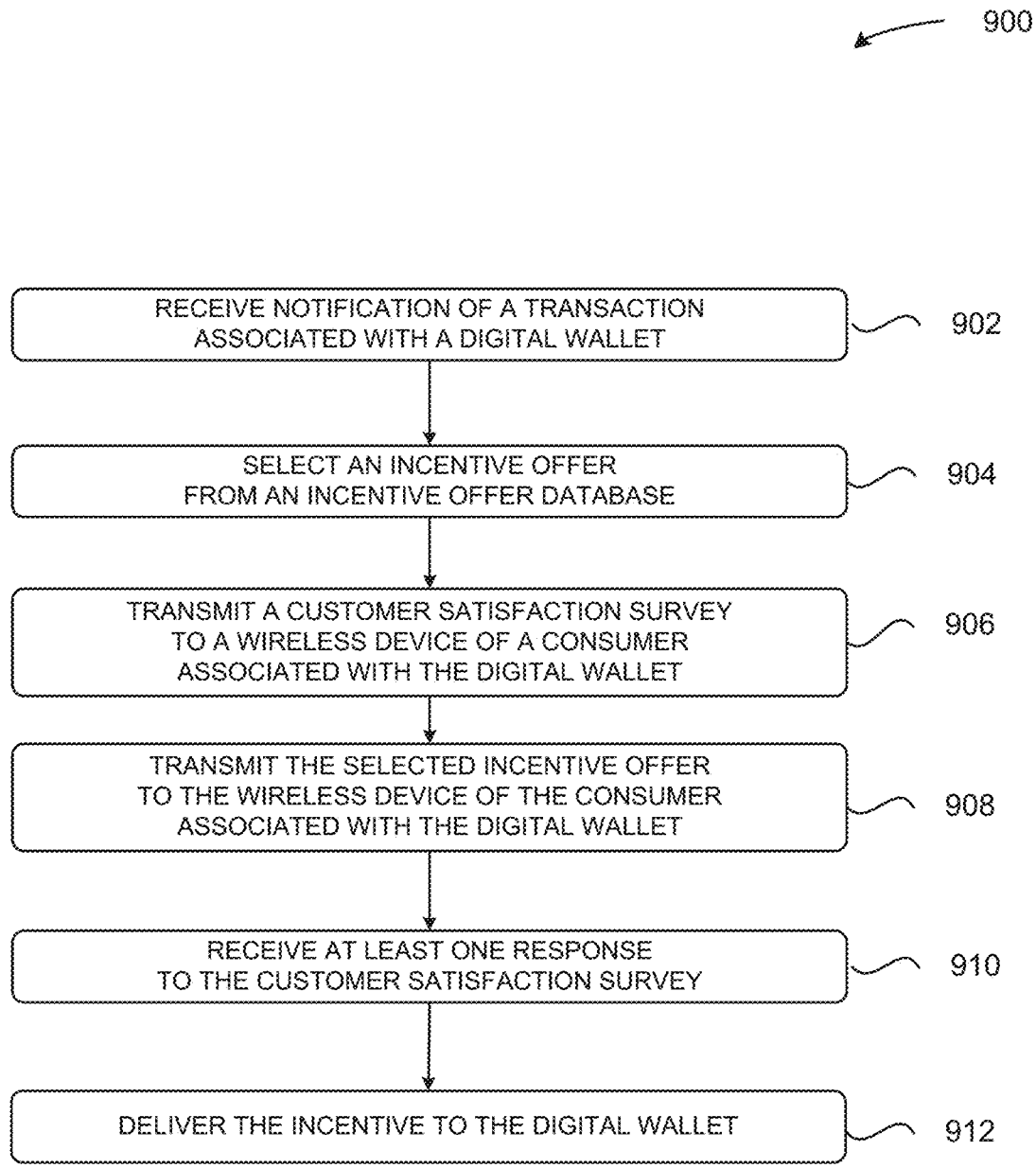
FIG. 9 represents a flowchart of another method of receiving real-time consumer transactional feedback according to some embodiments of this disclosure.

FIG. 9 represents a flowchart of another method of receiving real-time consumer transactional feedback according to some embodiments of this disclosure. According to some embodiments, some or all of the steps of flowchart 900 may be carried out by a system like system 100 as described with reference to FIG. 1.

At step 902, a notification is received of a transaction associated with a digital wallet. The particular digital wallet may, according to some embodiments, be associated with a consumer who has conducted business with a merchant.

At step 904, an incentive offer is selected from an incentive offer database. As described elsewhere herein, an incentive offer may be selected based on various combinations of preferences of a merchant, preferences of the consumer associated with the digital wallet, spending habits, and other consumer or merchant profile information.

At step 906, a customer satisfaction survey is sent to a wireless device of the consumer associated with the digital wallet. According to some embodiments, the satisfaction survey may include a simple star rating for the digital wallet transaction. The incentive offer of step 904, according to some embodiments, is intended to incentivize a response by the consumer to the customer satisfaction survey.

At exemplary step 908, the incentive offer is transmitted to a wireless device of the consumer associated with the digital wallet. The incentive offer may typically be displayed via a touch screen user interface of the wireless device of the consumer associated with the digital wallet.

At step 910, at least one response to the customer satisfaction survey is received. In the exemplary case of a transaction star rating, this step indicates that the consumer associated with the digital wallet has rated the transaction.

At step 912, the incentive reward is credited directly into the digital wallet. For example, if the incentive reward is a free muffin, the incentive reward may be displayed in the digital wallet user interface in a similar manner as location 608 of screen 602 as described with reference to FIG. 6.

Figure 10:
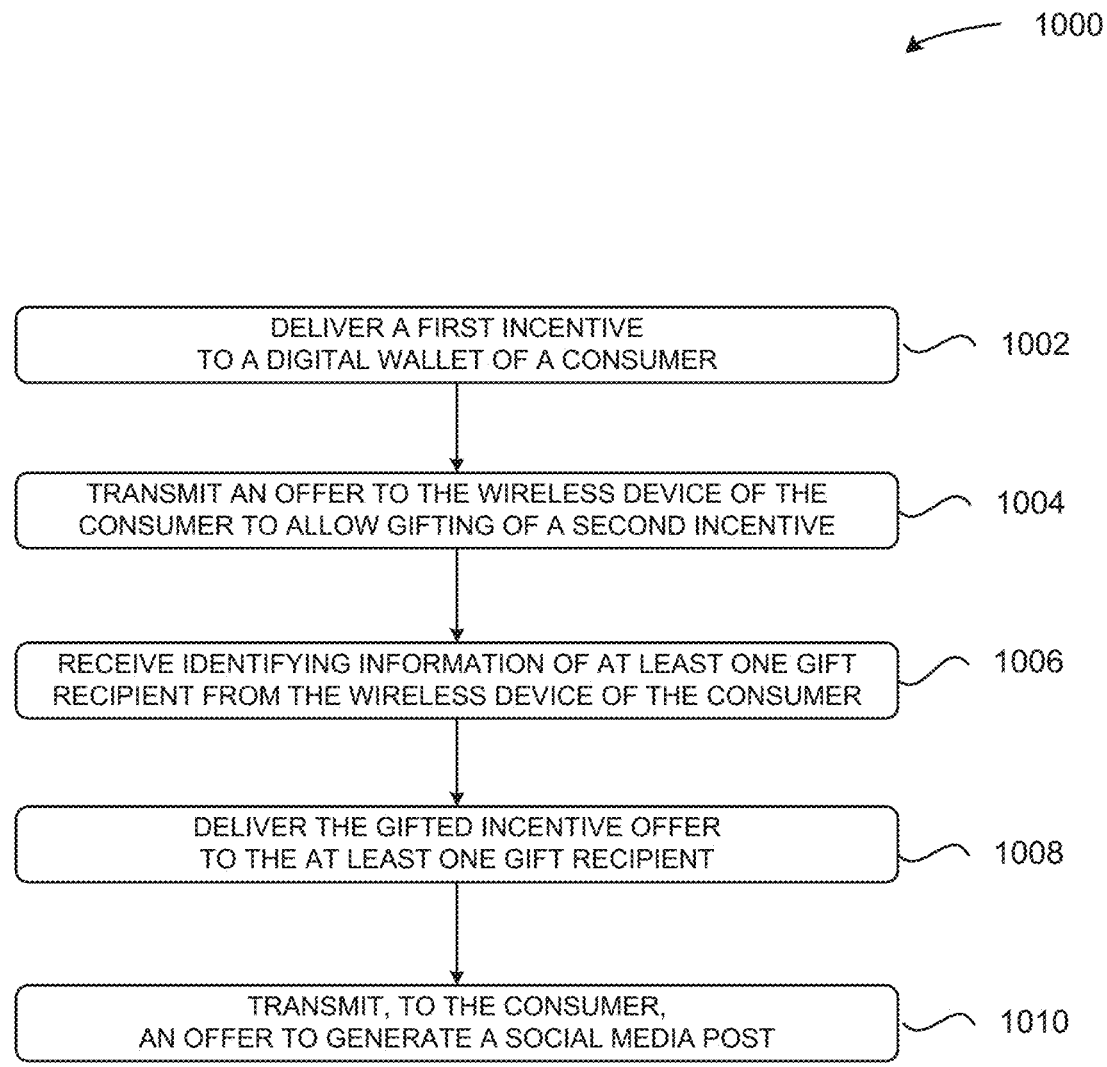
FIG. 10 represents a flowchart of a method for delivering an incentive to a digital wallet and allowing a consumer to gift an incentive offer to a third party, according to various embodiments of this disclosure.

FIG. 10 represents a flowchart of a method for delivering an incentive to a digital wallet and allowing a consumer to gift an incentive offer to a third party, according to various embodiments of this disclosure. According to some embodiments, some or all of flowchart 1000 may be performed by a system similar to system 100 as described with reference to FIG. 1.

At step 1002, a first incentive is delivered to a digital wallet of a consumer. For example, an incentive reward corresponding to a particular merchant may be delivered as explained in detail herein.

At step 1004, an offer to allow gifting of a second incentive from the consumer is made to one or more third parties. In some embodiments, the second incentive may be a duplicate of the original incentive reward of step 1002. According to some embodiments, the gifting offer may be displayed at a user interface of a wireless device associated with the consumer.

At step 1006, identification information related to the one or more third parties to receive a gifted incentive is received. The identification information may include, for example, any of an email address, digital wallet ID, or other appropriate identification information as would be apparent to one having ordinary skill in the art.

At step 1008, according to some embodiments, the one or more gifted incentive offers are delivered to the one or more identified third-party recipients using the identification information obtained at step 1006.

At optional step 1010, according to some embodiments, an offer is transmitted to the consumer to generate a social media post on the consumer's behalf. According to some embodiments, the offer may be presented at a user interface of a wireless device associated with the consumer.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A system comprising:
one or more hardware processors configured by machine-readable instructions to:
receive, at a consumer feedback server, an electronic notification of one or more transactions between a merchant and a consumer;
select the consumer to provide, by a wireless device of the consumer, feedback related to the one or more transactions;
transmit, from the consumer feedback server, a survey, for display on the wireless device of the consumer during or immediately after at least one of the one or more transactions, the survey comprising one or more questions related to the one or more transactions associated with the consumer;
select, by the one or more hardware processors, an incentive offer from an incentive offer database associated with the consumer feedback server;
transmit, from the consumer feedback server information related to the incentive offer, the information for display on the wireless device of the consumer;

receive, from the wireless device of the consumer, one or more responses to the survey;

responsive to receiving the one or more responses to the survey, fulfil the incentive offer by automatically depositing, by the one or more hardware processors, an incentive reward in a digital wallet associated with the consumer, wherein the incentive reward is related to the incentive offer and the digital wallet is accessed from the wireless device of the consumer or from another device; and display, in a user interface for the digital wallet, the incentive reward that is deposited in the digital wallet.

2. The system of claim 1, wherein the selection of the incentive offer depends at least in part on a geographical location of the mobile device.

3. The system of claim 1, wherein the selection of the incentive offer depends at least in part on an identity of a merchant associated with the one or more transactions associated with the consumer.

4. The system of claim 1, wherein the one or more hardware processors are further configured by machine-readable instructions to transmit, for display on a wireless device of a consumer, a notification that a survey is available to the consumer.

5. The system of claim 1, wherein the selection of the consumer depends at least in part on one or more of demographic information associated with the consumer or psychographic information associated with the consumer.

6. The system of claim 1, wherein the selection of the consumer depends at least in part on a consumer profile, the consumer profile associated with survey preferences defined by a merchant.

7. The system of claim 6, wherein the incentive offer is associated with the merchant.

8. A method of operating a wireless device, the method comprising:

receiving, at a consumer feedback server, an electronic notification of one or more transactions between a merchant and a consumer;

selecting the consumer to provide, by a wireless device of the consumer, feedback related to the one or more transactions;

transmitting, from the consumer feedback server, a survey, for display on the wireless device of the consumer during or immediately after at least one of the one or more transactions, the survey comprising one or more questions related to the one or more transactions associated with the consumer;

selecting, by a processor, an incentive offer from an incentive offer database associated with the consumer feedback server;

transmitting, from the consumer feedback server, information related to the incentive offer, the information for display on the wireless device of the consumer;

receiving, from the wireless device of the consumer, one or more responses to the survey;

responsive to receiving the one or more responses to the survey, fulfilling the incentive offer by automatically depositing, by the processor, an incentive reward in a digital wallet associated with the consumer, wherein the incentive reward is related to the incentive offer and the digital wallet is accessed from the wireless device of the consumer or from another device; and display, in a user interface for the digital wallet, the incentive reward that is deposited in the digital wallet.

9. The method of claim 8, wherein the selection of the incentive offer depends at least in part on an identity of a merchant associated with the one or more transactions associated with the consumer.

10. The method of claim 8, further comprising transmitting, for display on a wireless device of a consumer, a notification that a survey is available to the consumer.

11. The method of claim 8, wherein the selection of the consumer depends at least in part on one or more of demographic information associated with the consumer or psychographic information associated with the consumer.

12. The method of claim 8, wherein the selection of the consumer depends at least in part on a consumer profile, the consumer profile associated with survey preferences defined by a merchant.

13. The method of claim 12, wherein the incentive offer is associated with the merchant.

14. A non-transient computer-readable storage medium having instructions embodied thereon, the instructions being executable by one or more processors to perform a method for operating a wireless device, the method comprising:

receiving, at a consumer feedback server, an electronic notification of one or more transactions between a merchant and a consumer;

selecting the consumer to provide, by a wireless device of the consumer, feedback related to the one or more transactions;

transmitting, from the consumer feedback server, a survey, for display on the wireless device of the consumer during or immediately after at least one of the one or more transactions, the survey comprising one or more questions related to the one or more transactions associated with the consumer;

selecting, by the one or more processors, an incentive offer from an incentive offer database associated with the consumer feedback server;

transmitting, from the consumer feedback server, information related to the incentive offer, the information for display on the wireless device of the consumer;

receiving, from the wireless device of the consumer, one or more responses to the survey;

responsive to receiving the one or more responses to the survey, fulfilling the incentive offer by automatically depositing, by the one or more processors, an incentive reward in a digital wallet associated with the consumer, wherein the incentive reward is related to the incentive offer and the digital wallet is accessed from the wireless device of the consumer or from another device; and displaying, in a user interface for the digital wallet, the incentive reward that is deposited in the digital wallet.

15. The computer-readable storage medium of claim 14, wherein the selection of the incentive offer depends at least in part on an identity of a merchant associated with the one or more transactions associated with the consumer.

16. The computer-readable storage medium of claim 14, wherein the method further comprises transmitting, for display on a wireless device of a consumer, a notification that a survey is available to the consumer.

17. The computer-readable storage medium of claim 14, wherein the selection of the consumer depends at least in part on one or more of demographic information associated with the consumer or psychographic information associated with the consumer.

18. The computer-readable storage medium of claim 14, wherein the selection of the consumer depends at least in part on a consumer profile, the consumer profile associated with survey preferences defined by a merchant.

* * * * *